Gallaer & Tate,
2 Sheets, Sheet 2.
Horseshoe Nail Machine.
No. 105,189. Patented July 12, 1870.
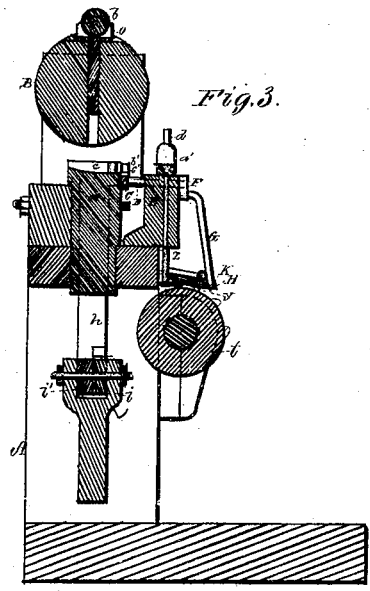
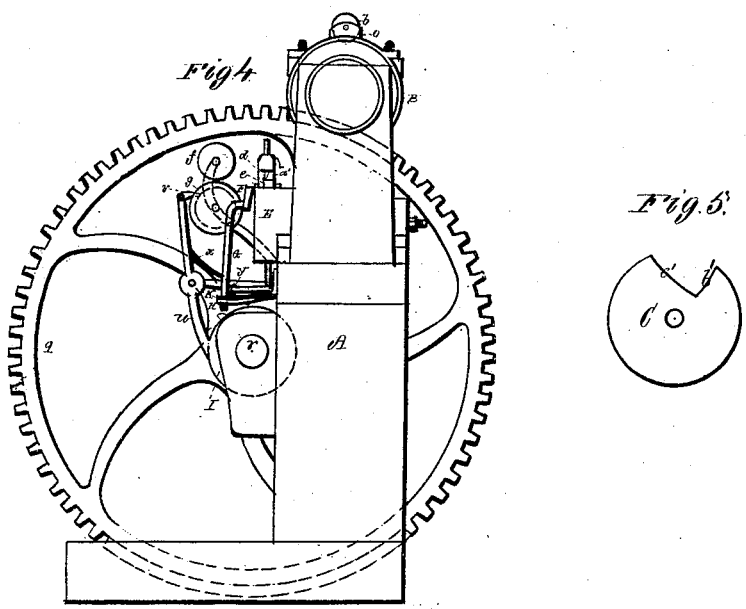
Witnesses
S. N. Piper
J. R. Snow
P. N. Gallaer & J. C. Tate
by their attorney
N. W. Eddy

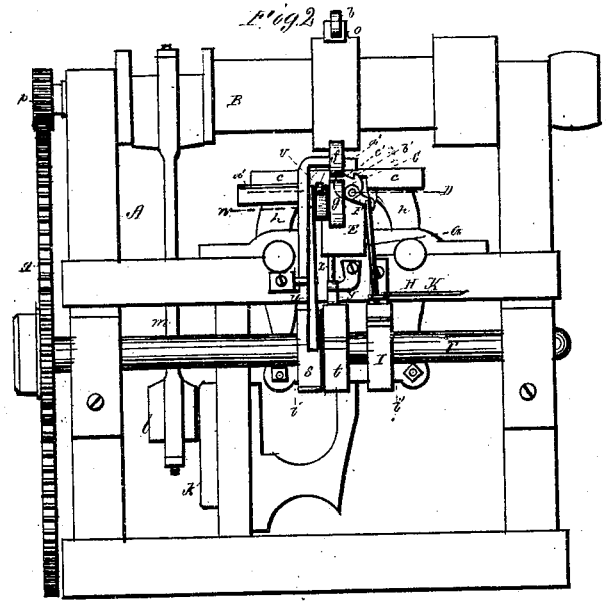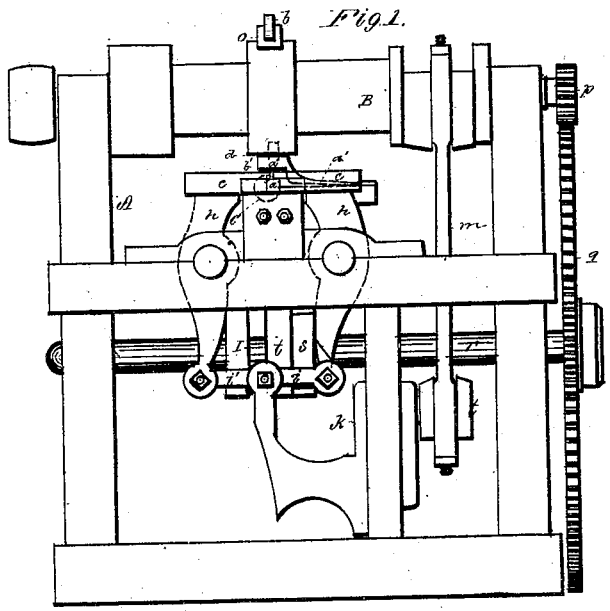

UNITED STATES PATENT OFFICE.

PETER N. GALLAER AND ISAAC C. TATE, OF NEW LONDON, CONNECTICUT.

IMPROVED MACHINE FOR MAKING HORSESHOE-NAILS.

Specification forming part of Letters Patent No. 105,189, dated July 12, 1870.

*To all persons to whom these presents may come:*

Be it known that we, PETER N. GALLAER and ISAAC C. TATE, of the city and county of New London, and State of Connecticut, have made a new and useful invention having reference to Machinery for Making Horseshoe-Nails; and do hereby declare the same to be fully described in the following specification and represented in the accompanying drawing, of which—

Figure 1 is a front elevation, Fig. 2 a rear view, Fig. 3 a transverse section, and Fig. 4 a side elevation, of a nail-machine provided with our invention.

In carrying out our invention we arrange and combine with an anvil-die, and with side dies or hammers and a planetary roller, disposed together and having mechanism, as hereinafter explained, for actuating them, a reciprocating rotary cutter and lifting-guide, and mechanism for operating such, the purpose of the said cutter and lifting-guide being to sever a nail or blank from the strip or rod when on the die, and to subsequently raise said rod upward and guide it to the dies; and, furthermore, we combine therewith griping-dies and feeding-rollers, and operative mechanism thereof, as hereinafter explained.

The machine to which we have made the addition of the cutter and lifting-guide and its operative mechanism is not herein claimed as of our invention, it being well known and in use. Its principal characteristics are a stationary die or anvil, $a$, a planetary roller, $b$, movable side dies $c$ $c$, griping-dies $d$ $e$, and feed-roller $f$ $g$, the whole being arranged within a suitable frame, A. The side dies $c$ $c$ are supported by two levers, $h$ $h$, connected by toggles $i$ $i'$, combined with a vertically-sliding pitman, $k$, such pitman being applied to a connecting-rod, $m$, by a universal or other proper joint, $l$, and the said connecting-rod being operated by an eccentric carried by a driving-shaft, B. The planetary roller $b$ is arranged in an arm, $o$, extended from the driving-shaft, which shaft at one end carries a pinion, $p$, that engages with a gear, $q$, fixed on an auxiliary or cam shaft, $r$. The shaft $r$ carries two cams or wipers, $s$ $t$, the first of which is to operate or move in one direction a lever, $u$, carrying a pawl, $v$, that works a ratchet, $w$, fixed on the lower feed-roller, $g$. A spring, $x$, imparts motion to the lever in the opposite direction. The other cam, with a vibratory arm, $y$, and a rod, $z$, arranged as represented, serves to raise the movable griper or die $d$, it being forced downward upon or toward the stationary griper F by the elasticity or spring of its carrier $a'$.

With such a machine we have combined the cutter and lifting-guide and its operative mechanism, such cutter and lifting-guide being shown at C in Figs. 2 and 3, and also in elevation in Fig. 5, which also exhibits its relation to the anvil and side dies. The part $b'$ of the said device C is a shear or knife to operate with the anvil-die to sever the nail from the rod, which is to rest on the part $c'$, and be guided by it and the knife. The said device C is fixed on the inner end of a horizontal shaft, D, supported on a standard, E, and provided with a crank, F. This crank is pivoted to a rod, G, which extends upward from an arm, H, extended from and pivoted to the frame of the machine, and arranged directly over a cam or wiper, I, fixed on the cam-shaft $r$, the whole being substantially as represented in the drawing. A spring, K, also extended from the frame of the machine, presses down on the arm H.

While the machine is in operation, and at a proper time for severing a nail from the nail-rod—that is, after each nail may have been formed by the dies—the cutter and lifter C will be turned so as to cause the shear $b'$ to separate the nail from the rod. The nail having been thus separated from the rod, the device C will next be turned backward by the reaction of the spring K, and will raise up the rod to a level with the face of the anvil-die, and serve with the shear to guide the rod upon the said die during the next advance of the rod by the feed-rollers. The nail-rod, after being introduced between the feed-rollers, will be fed forward upon the rest $c'$ of the part C, and thence upon the anvil-die. Next, the dies will perform their operations of swaging or forming a nail on the rod, after which the part C will be revolved so as to cut into the rod and separate the nail from that part of the rod in rear of it, the said part going down with the cutter $b'$, and being next raised by the part $c'$ up to the level of the anvil-die, the said elevation of the rod taking place during the return or back movement of the cutter $b'$. The form of the elevator-rest $c'$ will cause it, with the cutter $b'$, to guide the rod to the anvil during the advance of the rod by the feed-rollers.

We claim—

1. The combination and arrangement of the reciprocating rotary cutter and lifting-guide C and its operative mechanism with the anvil-die $a$, and with the planetary roller $b$ and the side dies $c\ c$, arranged and provided with operative mechanism, as explained.

2. The combination and arrangement of the reciprocating rotary cutter and lifter-guide C and its operative mechanism with the griping-dies $d\ e$, the anvil-die $a$, the planetary roller $b$, and the side dies $c\ c$, provided with mechanism for operating them, as explained.

3. The combination and arrangement of the feed-rollers $f\ g$ and the griping-dies $d\ e$ and their operative mechanisms with the reciprocating rotary cutter and lifter-guide C, the anvil-die $a$, and the side dies $c\ c$, and planetary roller $b$, and their operative mechanisms, as set forth.

P. N. GALLAER.
ISAAC C. TATE.

Witnesses:
   THOS. W. WALKER,
   ABIEL CONVERSE.